United States Patent [19]

Wertepny et al.

[11] Patent Number: 4,674,193
[45] Date of Patent: Jun. 23, 1987

[54] BENCH-CENTER INSTRUMENT

[76] Inventors: Alexander W. Wertepny, 2063 Craig Dr.; Stanley A. Wertepny, 715 Elizabeth La., both of Des Plaines, Ill. 60018

[21] Appl. No.: 892,744

[22] Filed: Aug. 1, 1986

Related U.S. Application Data

[63] Continuation of Ser. No. 706,030, Feb. 27, 1985, abandoned.

[51] Int. Cl.⁴ .............................................. G01B 5/20
[52] U.S. Cl. ..................................... 33/550; 33/147 E
[58] Field of Search ................ 33/549, 550, 551, 552, 33/553, 554, 555, 568, 572, 573, 147 E; 269/902, 43; 51/216 R, 217 R, 217 A

[56] References Cited

U.S. PATENT DOCUMENTS

| | | | |
|---|---|---|---|
| 2,472,040 | 5/1949 | Brookfield | 269/902 |
| 2,495,240 | 1/1950 | Duchesne | 33/147 E |
| 2,820,300 | 1/1958 | Gadomski | 33/147 E |
| 3,218,059 | 11/1965 | Andrew | 269/902 |
| 3,345,061 | 10/1967 | Schaefer | 269/902 |
| 3,791,039 | 2/1974 | Allix | 33/147 E |
| 3,824,744 | 7/1974 | Petrant | 33/568 |
| 3,905,116 | 9/1975 | Roberts | 33/555 |
| 4,064,633 | 12/1977 | Wertepny | 33/147 E |

Primary Examiner—Steven L. Stephan
Assistant Examiner—Patrick Scanlon
Attorney, Agent, or Firm—Wood, Dalton, Phillips, Mason & Rowe

[57] ABSTRACT

An adapting device is provided including a dead center with a cylindrical body and a live center with a tubular body, both of the centers including tapered center defining noses. A pair of yokes are adapted to secure the centers to V-blocks of a V-block instrument with their axes coincident with one another. A live center useful for adapting a V-block gauging instrument into a bench-center instrument is provided having a tubular body with a centering member slidably received therein. The centering member includes a neck portion extending through a reduced diameter opening in the tubular body. A spring biases the member so as to engage a piece to orient it for taking measurements, and a cam member pivots about the neck portion to retract the member when a piece is being mounted. A locking member is provided having a metal screw with a hex opening therein and a thumb grip secured over the screw head. An opening is provided in the thumb grip to allow access to the hex opening.

1 Claim, 6 Drawing Figures

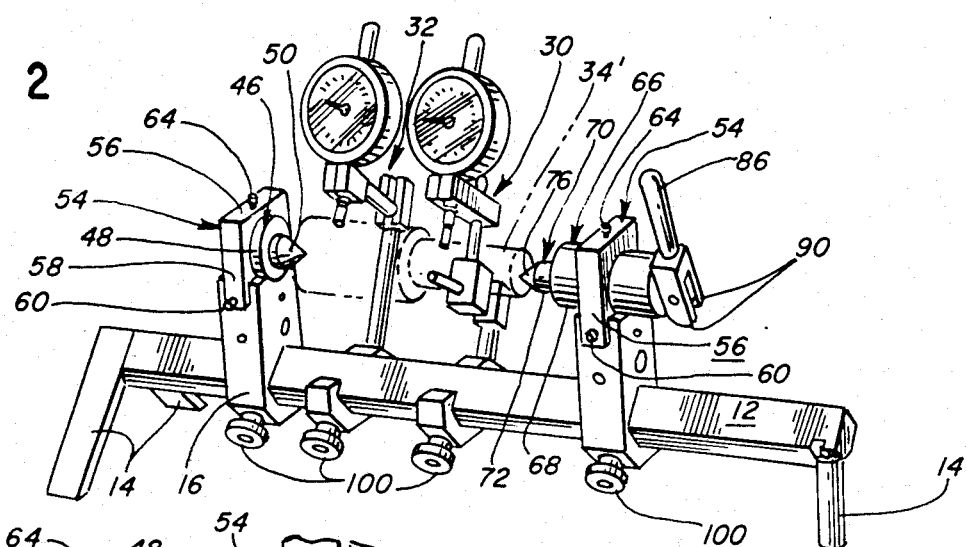
FIG. 2
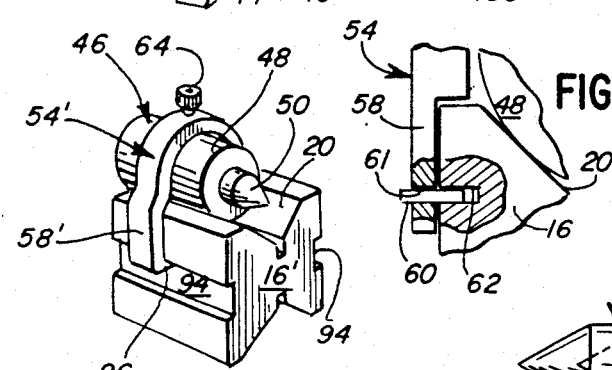
FIG. 2A
FIG. 4
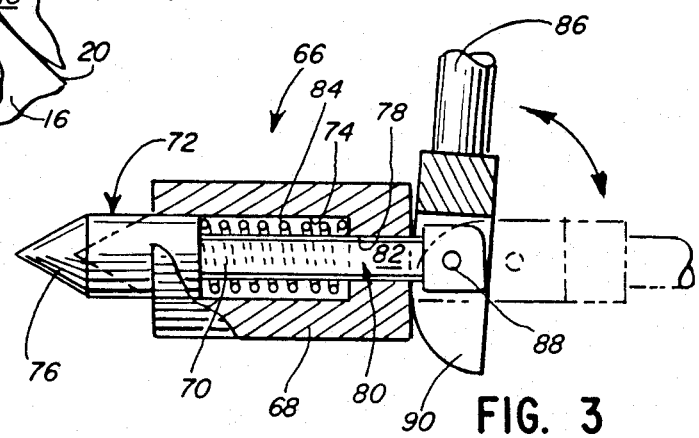
FIG. 3
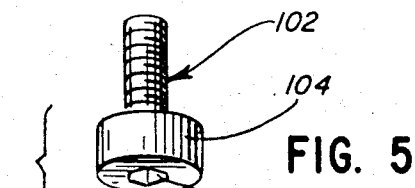
FIG. 5
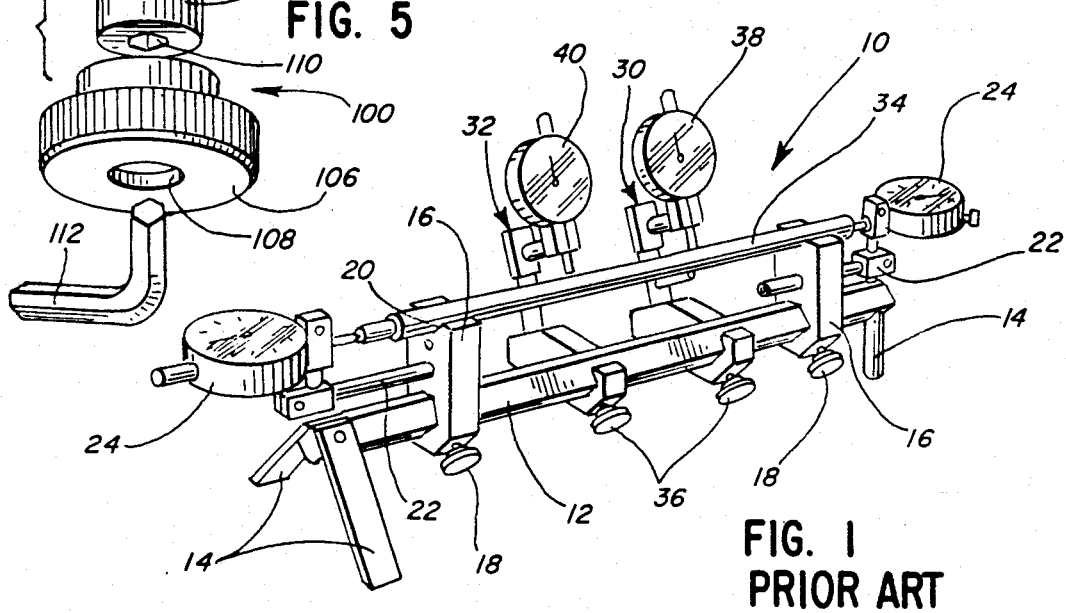
FIG. 1
PRIOR ART

BENCH-CENTER INSTRUMENT

This application is a continuation of application Ser. No. 706,030, filed Feb. 27, 1985 now abandoned.

BACKGROUND OF THE INVENTION

1. Technical Field

The present invention relates to bench-center instruments and more particularly to the conversion of a V-block measuring and gauging instrument into a bench-center instrument.

2. Background Art

V-block measuring and gauging instruments for measuring the length, diameter, concentricity, out-of-roundness and the like of machined part pieces which are to be supported on their surface (e.g. on bearings) are known in the art. One such instrument which may be located next to a machine tool for use by the machine tool operator to measure machined pieces immediately after machining is shown in my U.S. Pat. No. 4,064,633.

V-block measurements however have limited value with machined pieces which are to be supported between centers. It is preferable that measurements of such pieces be made by a bench-center instrument which supports the pieces on centers when measurements are taken. Bench-center instruments for taking such measurements are also known, one of which is shown in my U.S. Pat. No. 4,064,633.

The prior art instruments generally cost in the many hundreds and even thousands of dollars. Further, the prior art instruments, particularly bench-center instruments, are bulky, taking up a large space wherever they are located. This in many cases can prevent the instruments from being located near the machine tool where the machine tool operator may readily use them. Space limitations can be a particular problem where both V-block and bench-center instruments are required.

Still further, live centers of prior art bench-center instruments have been somewhat difficult to operate, requiring that the operator use two hands to prevent the instrument from tipping over or sliding on its supporting surface.

Further, the prior art instruments have encountered difficulty in that their components are sometimes inadvertently and undesirably moved from positions intended to be fixed for repeat measurements.

SUMMARY OF THE INVENTION

In one aspect of the present invention, a live center useful for adapting a V-block gauging instrument into a bench-center instrument is provided having a tubular body with a centering member slidably received therein. The centering member includes a neck portion extending a reduced diameter opening in the tubular body. A spring biases the member so as to engage a piece to orient it for taking measurements, and a cam member pivots about the neck portion to retract the member when a piece is being mounted.

In another aspect of the present invention, an adapting device is provided including a dead center with a cylindrical body and a live center with a tubular body, both of said centers including tapered center defining surfaces. A pair of yokes are adapted to secure the centers to V-blocks of a V-block instrument with their axes coincident with one another.

In still another aspect of the present invention, a locking member is provided consisting of a metal screw with a hex opening therein and a thumb grip secured over the screw head. An opening is provided in the thumb grip to allow access to the hex opening.

It is an object of the present invention to reduce the cost of measuring instruments used by machinists. It is another object of the present invention to minimize the space required by the measuring instruments, thereby enabling the instruments to be located adjacent the machine tool used to make the pieces to be measured. It is still another object of the present invention to provide a bench-center instrument which may be quickly and easily assembled when measurements are required on pieces to be supported between centers. It is still another object of the present invention to provide a live center for a bench-center instrument which may be simply and easily operated by one hand and yet which provides an accurate and reliable centering function. Yet another object of the present invention is to provide a structure whereby the various components along the mounting bar of an instrument may be easily secured by hand and yet also when desired may be tightly secured so that they may not be inadvertently loosened by hand.

BRIEF DESCRIPTION OF THE DRAWINGS

FIG. 1 is a perspective view of a prior art V-block measuring and gauging instrument;

FIG. 2 is a perspective view of a V-block instrument converted to use as a bench-center instrument by the present invention;

FIG. 2A is a partial cross-sectional view illustrating the yoke and V-block connection;

FIG. 3 is a partial cross-sectional view of the live center of the present invention;

FIG. 4 is a perspective view illustrating an alternative embodiment of the present invention; and FIG. 5 is a exploded view of an improved thumbscrew for use with the present invention.

DESCRIPTION OF THE PREFERRED EMBODIMENTS

One V-block measuring and gauging instrument 10 which may be converted to use as a bench-center instrument by the present invention is shown in FIG. 1. This prior art instrument is similar to the gauging instrument of my U.S. Pat. No. 4,064,633, the contents of which are hereby incorporated by reference, and includes a mounting bar 12 which is supported in spaced relationship from a surface by means of legs 14. Axially spaced from each other along the mounting bar 12 is a pair of V-blocks 16 which are adapted to be locked in position along the length of the bar 12 by means of thumbscrews 18 or the like. The V-blocks 16 each have a V-opening 20 which may be of any size, but is usually 60°, 60°, or 120°. Further, the V-openings 20 may be defined by carbide inserts (not shown) if desired, enabling the V-blocks 16 to be manufactured of relatively soft steel without affecting accuracy. The prior art V-blocks 16 shown in FIG. 1 are adapted to mount supports 22 for length measuring gauges 24.

Located between the V-blocks 16 on the mounting bar 12 are a floating gauge 30 for measuring diameter and the like and a fixed gauge 32 for measuring concentricity, out-of-roundness, and the like of a piece 34 mounted on the V-blocks 16. The gauges 30,32 may be secured by thumbscrews 36 or the like along the mounting bar 12 so that measurements may be taken at various axial positions along the piece 34. Each gauge 30,32 includes a dial indicator 38,40 which is commonly zeroed by taking measurements against a known piece. Thus, the instrument 10 allows a machine tool operator to readily check a piece after machining.

Exemplary floating and fixed gauges 30,32 such as shown are further described in my above-referenced U.S. Pat. No. 4,064,633. The particular gauge structure does not form a part of the present invention however, and any gauge structure usable with a V-block instrument for measuring diameter, concentricity, and the like would be suitable, as will be apparent.

V-block instruments 10 such as described above are used to check pieces 34 which will be supported about their surface (e.g. on bearings). Where the piece is to be supported between centers however, V-block measurements have limited value. Instead, it is much more valuable to measure those pieces with respect to their axial center as defined, for example, by axial bores in either end of the piece. While bench-center instruments for making such measurements are commercially available, they are expensive and generally cannot be located where they are readily accessible to the machinist in checking the machined pieces.

With the present invention, a V-block instrument may be adapted for use as a bench-center instrument such as shown in FIG. 2. And, as will be apparent from the disclosure below, the above-discussed V-block instrument 10 is merely exemplary, and virtually any V-block instrument may be readily converted to a bench-center instrument by using the present invention.

Specifically, the present invention includes a dead center 46 having a body 48 which is cylindrical about an axis. The dead center 46 also includes a center defining nose 50 which is conical about the same axis.

The dead center 46 is secured in the V-block 16 as shown in FIG. 2 by a yoke 54 which is U-shaped with a cross portion 56 interconnecting a pair of downwardly depending legs 58. As illustrated in FIG. 2A, each of the legs 58 has a pin 60 associated with it extending through a hole 61 in the leg and into a hole 62 in the V-block 16. The V-block holes 62 for the yoke pins 60 may be drilled in the V-blocks of virtually any prior art instrument to allow conversion of the instrument between V-block and bench-center operation as is described herein. So long as the outer diameter of the cylindrical body 48 is no greater than the maximum diameter acceptable by the particular V-block 16, the dead center 46 when secured in the V-block 16 will be oriented with its axis lying in the plane bisecting the V-opening 20 and parallel to the V-opening surfaces.

A locking screw 64 is located in the yoke cross portion 56 such that its lower end will engage the top of the dead center body 48 when the screw 64 is screwed in (i.e. toward the V-block 16). Thus, by tightening the locking screw 64 against the dead center body 48, the dead center 46 is rigidly fixed between the V-block 16 and the yoke 54 (or more precisely the locking screw 62) in the proper orientation as described above. Further, since the engagement between the locking screw 64 and the dead center 46 causes the yoke 54 to be pulled up, the leg pins 60 are placed in a shearing condition between the V-block 16 and associated yoke leg 58, thereby retaining the pins 60 in position without any specific retaining structure such as screw threads being required. This allows for use of pins 60 which freely slip in and out of the yoke 54 and V-block 16 during assembly, making assembly fast and easy.

A live center 66 is similarly secured to the other V-block 16 by a yoke 54 and locking screw 64. The live center 66 includes a tubular body 68 with a centering member 70 therein as shown in FIG. 3. The tubular body 68 has the same outer diameter as the dead center cylindrical body 48.

The centering member 70 includes a head 72 cylindrical about the tubular body axis and of substantially the same diameter as the body opening 74. The head 72 includes a center defining nose 76 which is conical about the head and body axis. Therefore, with the tubular body 68 suitable secured to the V-block 16, the live center 66 is oriented with its axis parallel to the V-opening surfaces and in the plane bisecting the V-opening 20. As a result of the alignment of the V-openings 20 of the two V-blocks 16 of the instrument, the axes of the dead and live centers 46,66 are coincident as is, of course, desired.

One end of the body opening 74 is partially closed such that a reduced opening 78 is defined therethrough. The reduced opening 78 preferably has an irregular shape and may be established in any suitable manner, as, for example, by securing a washer to one end of the tubular body 68.

The head 72 is secured to a neck 80 which extends through the reduced body opening 78. The neck 80 preferably has an irregular cross section, such as the flat surface 82 shown, similar to the irregular shape of the reduced opening 78 to prevent rotation of the centering member 70 within the tubular body 68.

A compression spring 84 is located over the centering member neck 80 and biases the head 72 outwardly from the tubular body 68. A lever 86 is pivotably secured to the member neck 80 by a pin 88. The lever 86 includes cam legs 90 which engage the tubular body 68 so as to retract the member head 72 into the tubular body 68 when the lever 86 is pivoted down as shown in phantom in FIG. 3. Retracting the member head 72 allows a piece 34' (shown in phantom in FIG. 2) to be located between the center defining noses 50,76 and the lever 86 may then be pivoted up (to the position shown in FIGS. 2 and 3) so that the spring 84 will extend the head 72 forward to properly position the piece 34' between centers as is desired.

The live center 66 described above may be operated with one hand without danger of tipping the instrument or sliding it on its supporting surface as frequently can occur with live centers of the prior art. The live center 66 disclosed therefore operates reliably, simply and accurately.

FIG. 4 illustrates an alternative embodiment of the present invention for use with a V-block 16' having grooves 94 on either side. Yokes 54' having inner flanges 96 received in the grooves 94 secure the centers (the dead center 46 is illustrated in FIG. 4) on such V-blocks 16' in a manner similar to the FIG. 2 embodiment (i.e. the centers 46,66 are squeezed between the V-openings 20 and locking screws 64). Still other suitable yoke structures functioning in a similar manner should be apparent to the skilled artisan after reviewing the above disclosure and figures.

Improved thumbscrews 100 are also disclosed for securing the V-blocks 16 and/or gauges 30,32 along the mounting bar 12. These improved thumbscrews 100 may be readily operated either by twisting by hand or by twisting with a wrench. Specifically, hex screws 102 are provided with knurled heads 104 as shown in FIG. 5. A thumb grip 106 is rigidly mounted over the knurled head 104 in a suitable manner so that turning the grip 106 by hand will turn the hex screw 102 for locking or unlocking the associated V-block 16 or gauge 30,32. The grip 106 also includes an opening 108 therethrough allowing access to the screw hex opening 110 by a hex (i.e. Allen) wrench 112. The hex wrench 112 may thus be used to lock the V-block 16 or gauge 30,32 and cannot be inadvertently unlocked by hand by a confused operator. This is particularly important where many repeat measurements are taken of multiple pieces.

Other aspects, objects and advantages of the invention can be obtained by a study of the drawings, the specification and the appended claims.

We claim:

1. A device for adapting a measuring and gauging instrument having first and second spaced V-blocks into a bench-center instrument, comprising:
    a dead center having a body cylindrical about an axis with an outer surface having a preselected, substantially uniform diameter and having a nose conically tapered about said axis, said body having axial ends;
    a live center for removable placement on one of said V-blocks and including
    a tubular body having axial ends, an outer surface with a preselected substantially uniform diameter and an internal bore of substantially uniform diameter partially along the axial extent of said tubular body to thereby define an axially facing first shoulder, said tubular body having a through bore in coaxial alignment with and of smaller diameter than said internal bore,
    a centering member received within said body and movable axially with respect to the tubular body of the live center, said centering member on one end having a conical nose,
    a neck portion on the centering member extending through said through bore, said neck portion being keyed to the tubular body in said through bore so that the neck cannot rotate about the tubular body axis in said through bore but is movable axially of said tubular body within said through bore,
    there being a second shoulder defined by the centering member and facing said axially facing first shoulder,
    a compression spring between said first and second shoulders, and
    a lever pivotably mounted to said neck portion, said lever including a cam surface adapted to engage said tubular body when pivoted to move said nose on the centering member axially against the bias of the spring;
    first and second U-shaped yokes adapted to secure, in axial alignment, the dead center body and the tubular body respectively to V-blocks of a gauging instrument, each yoke including a cross member connecting two legs and having a curved surface conforming substantially to the curvature of the outer surface of its respective center and having sufficient axial extent relative to the bodies of the centers to prevent vertical tilting of the axial ends of the bodies of the center away from the V-block so that the axial alignment of the bodies of the centers is maintained;
    means on each yoke leg for removably securing the yoke against movement away from the V-block to which it is secured; and
    a screw on the yoke cross member adjustable toward the V-block to engage the body of the center being secured.

* * * * *